W. P. BALLARD.

CURTAIN DRIER AND STRETCHER.

APPLICATION FILED MAR. 15, 1916.

Reissued July 11, 1916.

14,164.

2 SHEETS—SHEET 1.

Inventor

WILEY P. BALLARD

By Thomas R. Farner

Attorney

THE NORRIS PETERS CO., PHOTO-LITHO., WASHINGTON, D. C.

W. P. BALLARD.

CURTAIN DRIER AND STRETCHER.

APPLICATION FILED MAR. 15, 1916.

Reissued July 11, 1916.

14,164.

2 SHEETS—SHEET 2.

Inventor

WILEY P. BALLARD

By Thomas R. Harris

Attorney

THE KOBER LITH. CO., PHOTO-LITHO. WASHINGTON, D. C.

UNITED STATES PATENT OFFICE.

WILEY P. BALLARD, OF BIRMINGHAM, ALABAMA.

CURTAIN DRIER AND STRETCHER.

14,164. Specification of Reissued Letters Patent. Reissued July 11, 1916.

Original No. 1,162,738, dated December 7, 1915, Serial No. 35,298. Application for reissue filed March 15, 1916. Serial No. 84,448.

*To all whom it may concern:*

Be it known that I, WILEY P. BALLARD, a citizen of the United States of America, residing at Birmingham, in the county of Jefferson and State of Alabama, have invented certain new and useful Improvements in Curtain Driers and Stretchers, of which the following is a specification.

The present invention appertains to an improved curtain drier and stretcher, designed particularly for use in connection with drying rooms of a laundry, etc. but of course the device is applicable for use as a piece of domestic furniture, for the purpose of drying and stretching lace curtains, etc.

The primary object of the invention is the provision of a combined drier and stretcher upon which curtains and other similar articles may be attached in such manner that the original shape of the article may be retained while it is being dried and stretched so that when the curtain is hung after washing and drying, it will present its original artistic and graceful appearance.

Further objects of the invention are to provide adjusting devices for holding the device in position while the article to be stretched or dried is being attached to the stretcher frame.

The invention consists in certain novel combinations and arrangements of parts as will be hereinafter more fully pointed out and claimed.

In the accompanying drawings I have illustrated one complete example of the physical embodiment of my invention constructed according to the best mode I have so far devised for the practical application of the principle of my invention.

Figure 1:
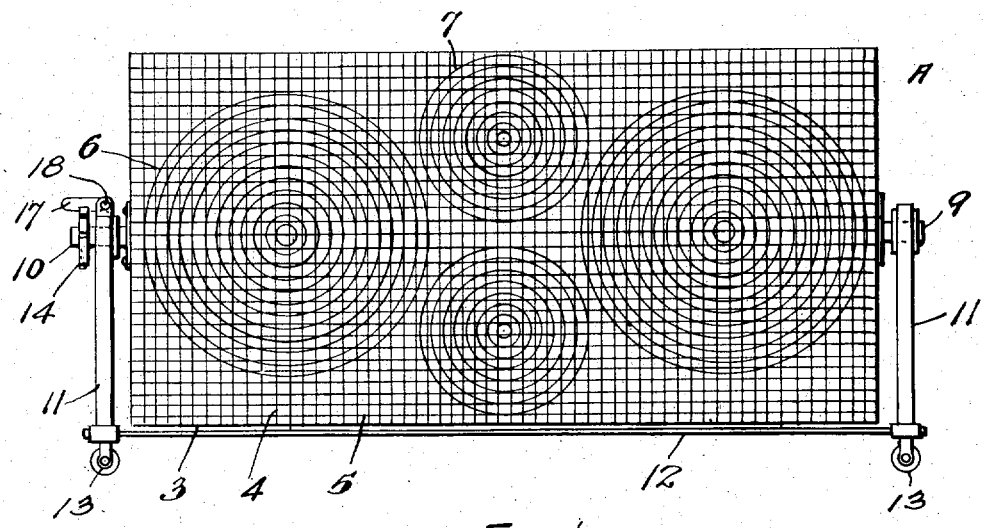
Figure 2:
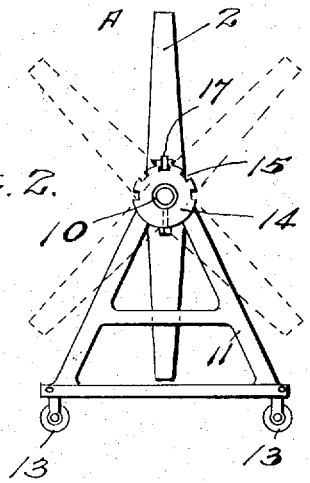
Figure 3:
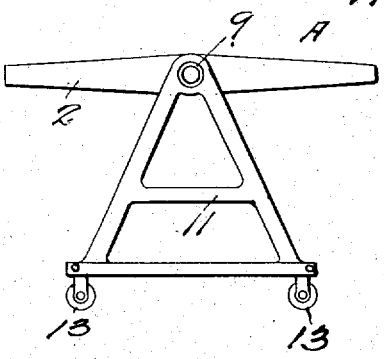
Figure 4:
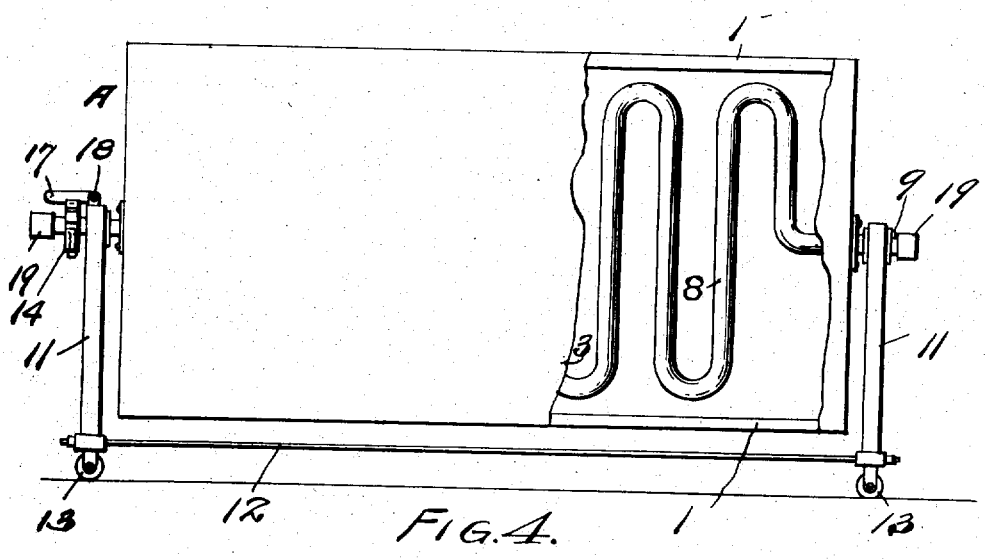
Figure 5:
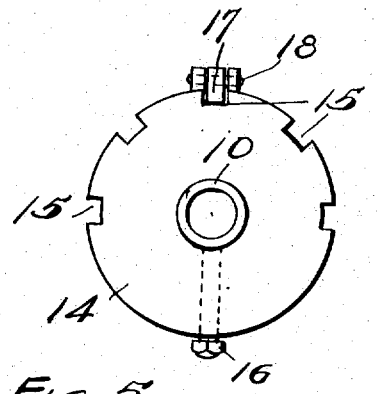
Figure 6:
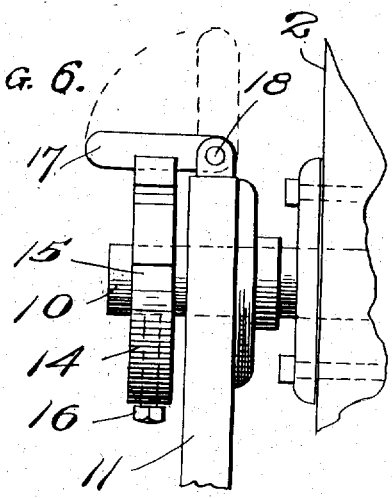

Figure 1 is a side elevation of the drier and stretcher constructed according to my invention. Fig. 2 is an end view, showing in dotted lines the different positions to which the stretcher frame may be adjusted to attach articles, or to present the attached curtain to the drying medium, either natural or artificial. Fig. 3 is a view of the device taken from the opposite end of Fig. 2 showing the stretcher frame in horizontal position. Fig. 4 is a side elevation partly broken away to disclose a steam pipe coil inside the frame for drying from the interior. Fig. 5 is an enlarged detail view of a notched wheel or circular plate with its pawl for holding the stretcher frame in adjusted position. Fig. 6 is a side elevation of the retaining device for holding the stretcher frame in adjusted position.

In the preferred embodiment of my invention as illustrated in the drawings the stretcher proper is designated by the letter A. This stretcher is composed of a rectangular frame 1 with end bars 2, 2 and the whole frame is covered with a canvas covering 3. As shown in Fig. 1 the canvas covering is provided with two series of parallel lines as 4 and 5, the former extending transversely of the stretcher frame and the latter extending longitudinally thereof, and these two series of lines are arranged at right angles to each other. Both sides of the stretcher covering are provided with these two series of lines, and it will be apparent that they are for the purpose of guiding the operator when attaching a curtain or other article so that the article may be attached with precision and symmetry. Thus if the article be of oblong shape like a curtain, the four edges of the curtain may be matched to the four lines forming the oblong on the canvas the size of the curtain. If a square doily is to be attached, it will readily be seen that the four edges of the doily are matched to the four lines forming the square of the proper size on the canvas. In addition to the straight lines I provide several series of concentrically arranged circles as 6 and 7 which are adapted to guide the operator in attaching circular articles. The multiplicity of circles adapts the device for use with many sizes of circular doilies, etc., and when their edges are matched to the proper size circle it is evident that the doily will be stretched and dried in exact and symmetrical shape. Any suitable devices, as pins may be used to attach the articles to the canvas covering, and when so attached the stretcher is exposed to the proper heat, either natural or artificial.

In Fig. 4 a steam coil is provided as indicated at 8 in the interior of the stretcher frame so that the articles to be dried may be heated from the inside if wished.

Preferably the stretcher is revolubly supported, as upon hollow trunnions 9, 10, in a supporting frame composed of the end standards 11, 11, and connecting bars 12, 12, and this frame is supported upon casters 13 so that it is portable. The trunnions are journaled in the standards 11 so that the stretcher may be revolved, as indicated in Figs. 2 and 3, in order to facilitate the attachment of the articles to be dried, or to expose the article in best manner to the drying medium. Thus the stretcher may be adjusted to horizontal or vertical positions, or held in positions at angles to either the horizontal or vertical.

To retain the stretcher in adjusted position I employ on the trunnion 10 a notched circular plate or wheel 14 formed with notches 15 and secured to move with the trunnion by means of the set bolt 16. I have indicated only five notches in the circular plate, but it will be understood as many notches may be used as is desired. This notched wheel is designed to co-act with the pawl 17, pivoted at 18 on the standard 11 in position to turn down into one of the notches 15 and hold the stretcher in desired position. To free the stretcher, the pawl may be turned to vertical position as shown in dotted lines Fig. 6, and then the stretcher may be revolved on its trunnions as desired.

In Fig. 4 I have illustrated caps 19 on the ends of the hollow trunnions, and these caps are designed for attachment of a steam supply pipe when it is desired to dry the articles from the interior of the stretcher frame.

What I claim is:—

1. The combination with a supporting frame of a stretcher frame having end trunnions revoluble in said frame, means for retaining the revoluble stretcher frame in adjusted position, and a canvas covering on said stretcher frame having guide lines for matching the edges of articles to be dried.

2. The combination in a fabric drying and stretching device with a stretcher frame, of a covering for the frame having guide markings thereon and adapted to retain articles.

3. The combination in a fabric drying and stretching device with a stretcher frame of a canvas covering for the frame, and said canvas covering being provided on its external face with guide lines for guiding and matching the edges of the articles to be dried.

4. The combination with a supporting frame, of a stretcher frame having end hollow trunnions revoluble in the supporting frame, a covering on the stretcher frame having guide markings thereon and adapted to retain articles, and a steam coil in the stretcher frame with inlet and outlet through the trunnions.

5. The combination in a fabric drying device with its frame, of a covering for the frame having guide markings thereon and adapted to retain articles, and means for heating the exterior surface of the covering from the interior of the frame.

In testimony whereof he affixes his signature.

WILEY P. BALLARD.

Copies of this patent may be obtained for five cents each, by addressing the "Commissioner of Patents, Washington, D. C."